March 4, 1924.
W. C. HARTMANN
CASTER
Filed Nov. 23, 1922
1,485,676
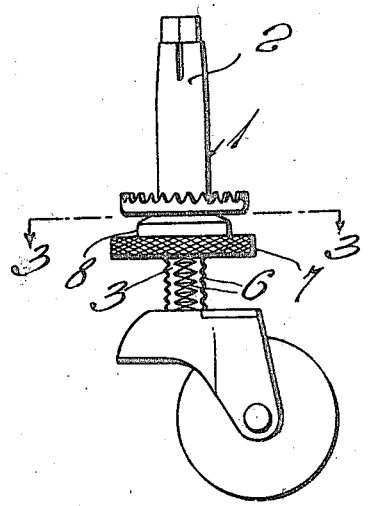
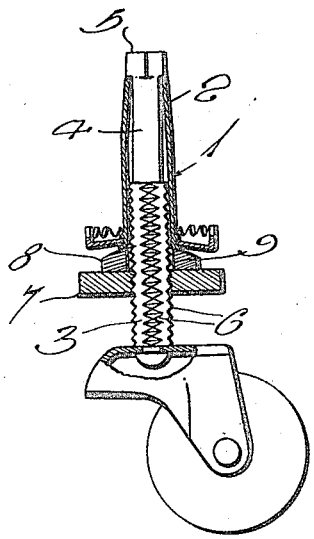
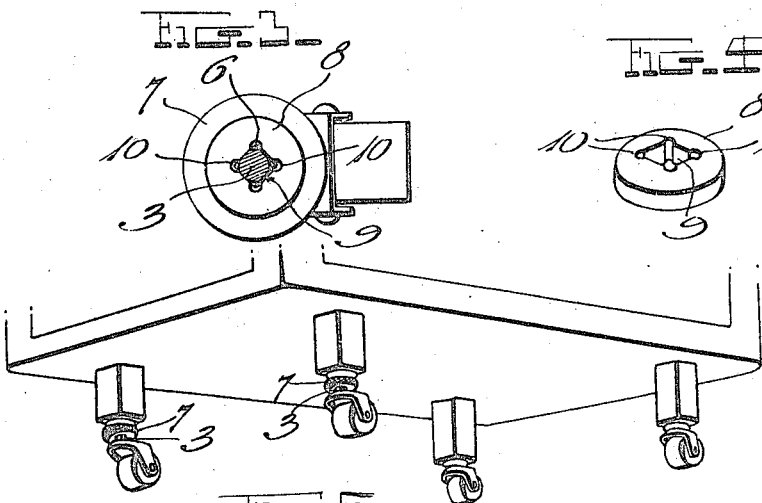
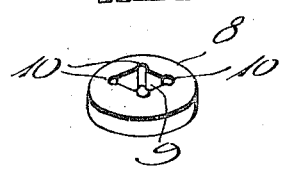
Inventor
W. C. HARTMANN Patented Mar. 4, 1924.

1,485,676

UNITED STATES PATENT OFFICE.

WILLIAM C. HARTMANN, OF CLEVELAND, OHIO, ASSIGNOR OF ONE-HALF TO C. A. FLEMING, OF CLEVELAND, OHIO.

CASTER.

Application filed November 23, 1922. Serial No. 602,826.

*To all whom it may concern:*

Be it known that I, WILLIAM C. HARTMANN, a citizen of the United States, residing at Cleveland, in the county of Cuyahoga and State of Ohio, have invented certain new and useful Improvements in Casters; and I do declare the following to be a full, clear, and exact description of the invention, such as will enable others skilled in the art to which it appertains to make and use the same.

My invention relates to improvements in furniture supporting casters, and has for its object to provide an extremely simple and inexpensive device of this character which may readily be adjusted vertically according to any inaccuracy in the floor upon which the furniture rests.

With the foregoing in view, the invention resides in the novel subject matter hereinafter described and claimed the description being supplemented by the accompanying drawings.

Figure 1 is a side elevation of a caster constructed in accordance with my invention.

Figure 2 is a vertical sectional view showing parts in elevation.

Figure 3 is a horizontal sectional view taken on the line 3—3 of Figure 1.

Figure 4 is a perspective view of a washer which is interposed between the weight supporting caster and the lower end of the guide for the caster shank, and Figure 5 is a perspective view showing two of the casters attached to an article of furniture in connection with two ordinary casters.

In the drawings above described, the numeral 1 designates an upright tubular guide of well known form adapted to be received in a bore in the lower end of a furniture leg or the like, said guide having the usual self-contracting upper end 2. The numeral 3 designates the upright shank received rotatably and slidably in the guide 1, said shank being provided with a reduced upper end 4 which passes through the upper end of the guide 1 and is provided with a head 5 normally co-acting with the self-contracting guide end 2, to prevent withdrawal of the shank from the guide.

The body portion of the shank 3 in the construction here disclosed, is square horizontal section and is provided on its four corners with screw threads 6. A knurled adjusting nut 7 is threaded on the shank to support the weight of the furniture or the like with which the caster is used, but to prevent turning of the shank within the nut when it turns in the guide 1, I interpose a washer 8 between the nut 7 and the lower end of the guide, said washer having a square opening 10 slidably and non-rotatably receiving the shank 3. The upper side of the washer 8 is preferably convex to engage the lower end of the guide 1, thereby tending to center the shank 3 in said guide and relieving the screw threads of unnecessary wear against the wall of said guide. When the shank turns in the guide 1, the washer 8 and the nut 7 turn with said shank so that there is no possibility of the nut being turned upon the shank and thus accidentally changing the adjustment of the caster.

In order that the corners of the opening 9 shall not in any manner injure the screw threads 6 they are vertically enlarged at the corners by vertical grooves 10 receiving said screw threads.

The improved casters may be used on any article of furniture but in order to properly level the same it is usually only necessary to use two of the improved casters in connection with two of the old ones, as shown more particularly in Figure 5.

As excellent results have been obtained from the details shown, they are preferably followed, but within the scope of the invention as claimed, numerous minor changes may be made.

I claim:

1. A caster having an upstanding shank, said shank being square in cross section and having screw threads on its corners, a guide slidably and rotatably receiving said shank, a weight supporting nut threaded adjustably on the shank under said guide, and a washer interposed between said guide and said nut, said washer having a square opening receiving the shank, and the corners of said opening being grooved to clear the screw threads of the shank.

2. The structure set forth in claim 1, said washer having a convex upper side for engaging the lower end of said guide so as to center the shank in said guide.

In testimony whereof I have hereunto affixed my signature.

WILLIAM C. HARTMANN.